United States Patent [19]

Ishmael

[11] Patent Number: 4,594,921
[45] Date of Patent: Jun. 17, 1986

[54] CABLE STRIPPING APPARATUS

[75] Inventor: John Ishmael, Chino, Calif.

[73] Assignee: The United States of America as represented by the Secretary of the Army, Washington, D.C.

[21] Appl. No.: 763,860

[22] Filed: Aug. 9, 1985

[51] Int. Cl.⁴ .............................................. H02G 1/12
[52] U.S. Cl. ........................................ 81/9.4; 81/9.44
[58] Field of Search ................... 81/9.4, 9.44; 30/90.1, 30/90.6, 90.7

[56] References Cited

U.S. PATENT DOCUMENTS

| | | | |
|---|---|---|---|
| 2,683,308 | 7/1954 | Cook | 30/91.1 |
| 2,978,565 | 4/1961 | Sullivan et al. | 81/9.44 |
| 2,984,905 | 5/1961 | Harmon | 30/90.1 |
| 3,752,017 | 8/1973 | Lloyd et al. | 81/9.44 |

*Primary Examiner*—James L. Jones, Jr.
*Attorney, Agent, or Firm*—Anthony T. Lane; Jeremiah G. Murray; Paul A. Fattibene

[57] ABSTRACT

This tool permits rapid and easy stripping of the outer insulation from co-axial cables or the like. The end of the cable to be stripped is first inserted into a gauging hole in a block of insulating material. A pair of blade-shaped electrical heating elements are clamped against opposite sides of the cable at the mouth of the hole and the cable rotated to form a thermal circumferential cut in the outer insulation. The cable end is then placed in another jig with a V-shaped groove therein and a blade-shaped heating element at the bottom of the groove. A second similar heating element is arranged above the groove and the cable. These two heating elements produce diametrically opposed longitudinal cuts in the insulation, after which two pieces of the insulation can be easily removed.

6 Claims, 6 Drawing Figures

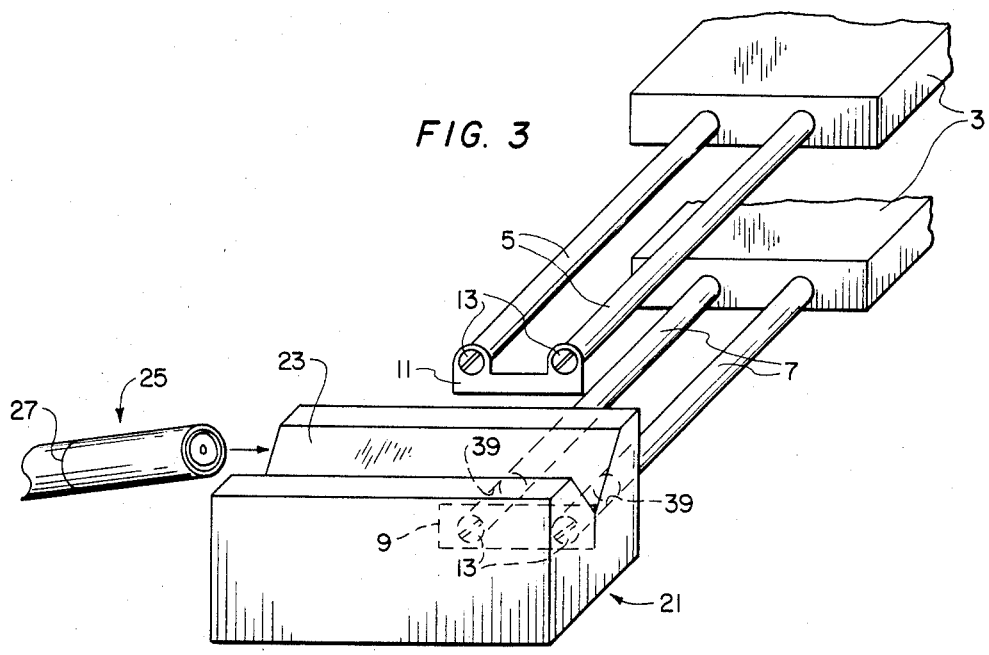
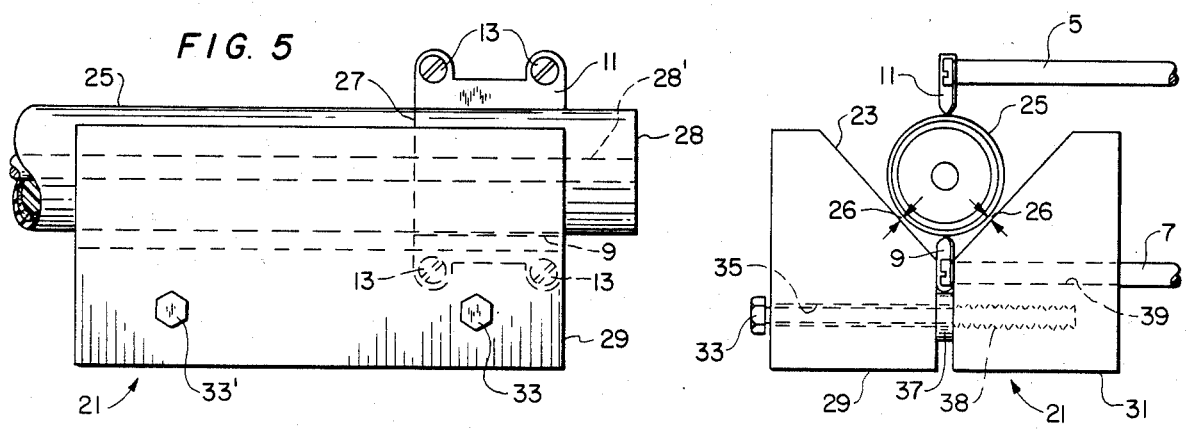
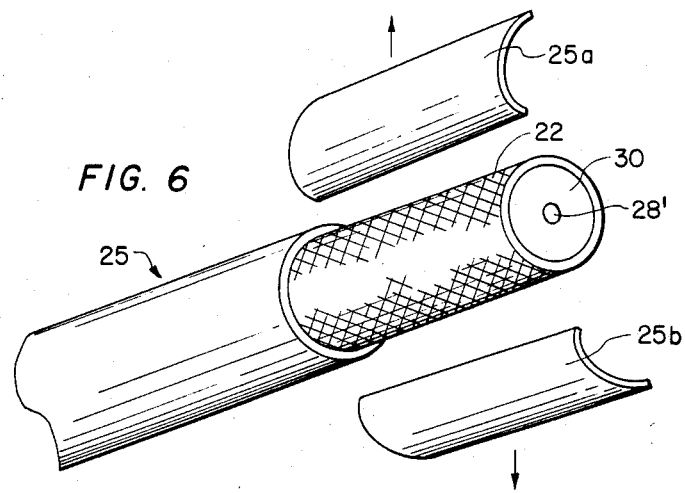

CABLE STRIPPING APPARATUS

The Government has rights in this invention pursuant to contract DAAK20-81-C-0134, awarded by the Dept. of the Army.

BACKGROUND OF THE INVENTION

Electrical co-axial cables comprise a metallic outer conductor, which is usually braided, and are often provided with an outer jacket of plastic, usually Teflon. Prior to the connection of such a cable to another circuit element or to a connector, it is often necessary to strip a length of this outer insulation from the end of the co-axial cable. Prior methods of doing this have included cutting the Teflon insulator circumferentially either with a knife or with a thermal stripping tool. The outer insulator between the circumferential cut and the cable end was then pulled off. Extruded Teflon insulation is very difficult to pull off if only such a circumferential cut is provided. Further, mechanical cutters such as knives often damage the underlying braided outer conductor.

Military specifications require that the stripped end of the co-axial cables have a particular length with a tolerance of 0.005 inches. Such a tolerance is extremely difficult to obtain with the prior art tools of the types described. The present invention comprises novel apparatus which provides for the easy removal of accurate lengths of the outer insulation without damage to the underlying braided conductor.

SUMMARY OF THE INVENTION

The invention comprises a modification of an existing thermal stripping device by means of which an accurately located circumferential cut can be made in the co-axial cable outer insulation, and then a pair of longitudinal thermal cuts can be made in the outer insulation which is to be removed.

The tool comprises a jig comprising a block of insulating material with a gauging hole therein, the hole having a depth approximately equal to the length of the outer insulation to be stripped from the cable. A prior art thermal stripper having a pair of heating elements mounted at the ends of separate pairs of arms has one pair of these arms projecting through the block on one side of the gauging hole, with the heating element thereof mounted adjacent and partially overlapping the outer end or the mouth of the gauging hole. The other pair of arms with its associated heating element extend above the block in such a way that this heating element can contact the outer insulation of a cable which is inserted into the gauging hole. The cable is inserted into the hole and rotated while it is clamped between the two operating heating elements, to form the circumferential cut in the outer insulation.

The tool also comprises a second jig which comprises an insulated block with a V-shaped groove therein with the first or the lower one of the aforementioned heating elements arranged at the bottom of the V so that it can provide one of the required longitudinal cuts in the outer insulation while a second heating element can simultaneously provide a second such cut approximately diametrically opposite. The second jig my comprise a pair of parts which are bolted together with the first heating element sandwiched between the two parts.

It is thus an object of the invention to provide a tool for rapidly and accurately stripping a predetermined length of outer insulation from an electrical conductor such as a co-axial cable.

Another object of the invention is to provide a tool for thermally making both circumferential and longitudinal cuts in insulating material which forms a jacket for a cylindrical conductor such as a co-axial cable.

A still further object of the invention is to provide a tool for rapidly and accurately removing a given length of the outer Teflon insulation from co-axial cables without damaging the underlying outer conductors thereof.

Another object is to provide a jig for use with a thermal stripper for making accurate circumferential cuts in the outer insulation of electrical conductors.

Another object is to provide a tool for making longitudinal cuts in the outer insulation of electrical cables.

A still further object of the invention is to provide a tool for making accurately located circumferential cuts in insulation which provides an outer jacket for an electrical cable, said tool comprising a block of thermally and electrically insulating material with a blind gauging hole therein, said hole having a diameter slighty larger than that of said cable, an electrically heated element located at one side of the mouth of said hole and overlapping said mouth by the approximate thickness of said insulation, and another moveable electrical heating element arranged to contact the diametrically oposite side of said mouth of said hole, whereby a length of said cable may be inserted into said hole with said heating elements contacting opposite sides of the said insulation thereof, and said cable rotated to provide said accurate circumferential cut in said insulation.

Another object of the invention is to provide a tool for making diametrically opposed longitudinal cuts in insulation which comprises the outer jacket of an electrical conductor, comprising a jig which comprises a block of electrically and thermally insulating material with a V-shaped groove therein, a first electrical heating element located along the bottom of said groove and projecting upward into said groove so that when said cable is inserted in said groove said heating element will thermally cut through said outer jacket, and a moveable heating element arranged above said groove and said c cable to simultaneously provide a second longitudinal cut in said outer jacket approximately at a diametrically opposed point from the cut provided by said first heating element.

These and other objects and advantages of the invention will become apparent from the following detailed description and the drawings.

BRIEF DESCRIPTION OF THE DRAWINGS

FIG. 3 shows how the stripper of FIG. 1 can be modified to provide two longitudinal cuts in the outer insulation.

FIGS. 4 and 5 are end and side views of the jig used in FIG. 3, illustrating one possible construction thereof.

FIG. 6 shows how the undisired insulation can be easily removed after it is cut by the tools of FIGS. 2 and 3.

DETAILED DESCRIPTION OF A PREFERRED EMBODIMENT

Figure 1:
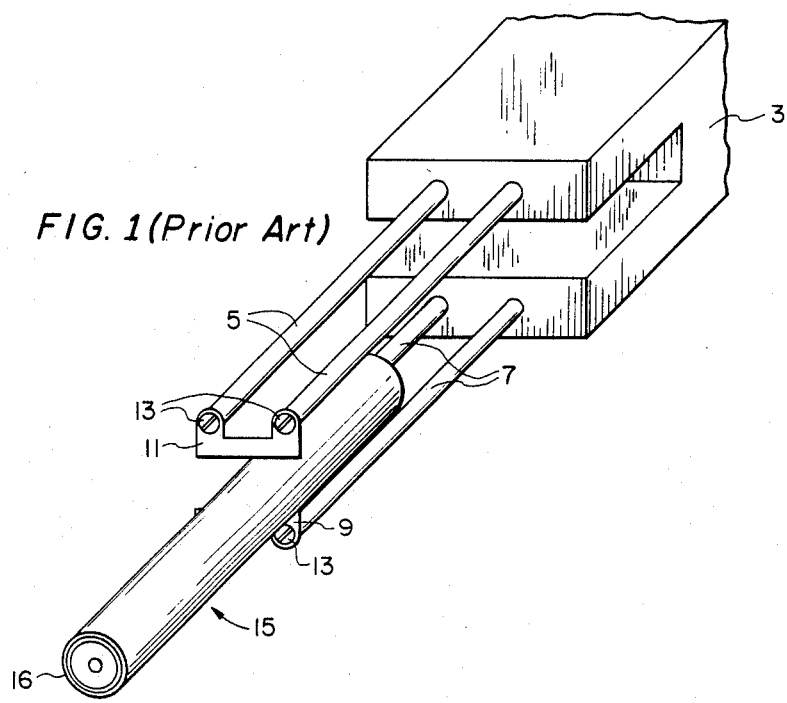
FIG. 1 shows a prior art thermal stripper.

The prior art thermal stripping tool of FIG. 1 is a type made by Kinetics Co. of Solano Beach, Calif. It includes a body portion 3 which may contain a transformer, not shown, for providing electrical current of the proper voltage for application to the two blade-shaped heating elements 9 and 11. The heating elements are mounted at the ends of the upper and lower arms 5 and 7, by means of screws 13, as shown. The arms 5 and 7 are electrically conductive or may comprise a central conductor with an insulating jacket, and are also somewhat flexible so that the heating elements can be moved toward and away from each other. In the prior art, a co-axial cable to be stripped, such as 15, would be inserted, as shown, between the heating elements 9 and 11 and the cable rotated while pressure was applied to the arms 5 and 7 to hold the elements against the outer insulation 16 of the cable. The heating elements would thus burn a circumferential hole or cut in the outer insulator. Under the old practice, the outer insulator had to be pulled or ripped off of the end of the cable. This was often difficult or impossible especially with insulation comprising extruded Teflon. Aslo, it can be appreciated that this tool and method would not provide for the removal of accurate, reproducible lengths of outer insulation.

Figure 2:
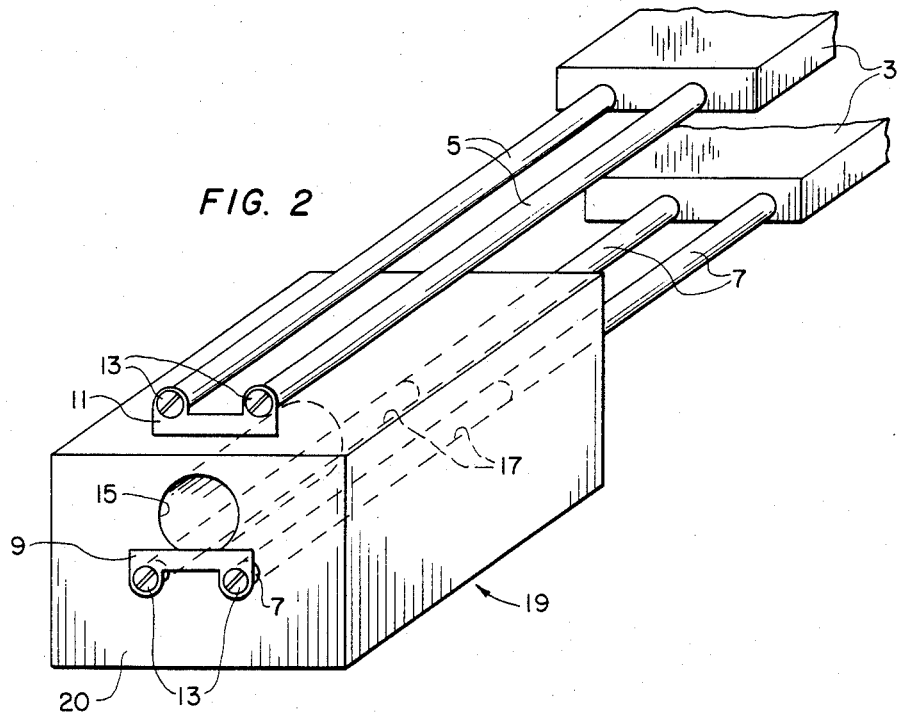
FIG. 2 shows how the stripper of FIG. 1 can be modified to provide precisely located circumferential cuts in the outer insulation of a cable.

FIG. 2 is a modified tool which can produce the required accurate and reproducible circumferential cut. This tool is the prior art device of FIG. 1 with a jig comprising block 19 attached to the lower arms thereof. The block 19 is made from material which is both electrically and thermally insulating. Block 19 includes a gauging hole 15 which has a diameter slightly more than that of the cable to be stripped and has a depth slightly less than the length of the outer insulation to be stripped from the end of the cable. The lower arms 7 of the thermal stripper extend through the two parallel holes 17 in block 19, which holes are designed to accommodate them. The lower arms 7 project through the front surface 20 of block 19 and have the lower heating element 9 attached to the projecting arms, as shown. The holes 17 are located so that the heating element 9 overlaps the mouth of gauging hole 15 sufficiently so that the element 9 can thermally cut through the thickness of the outer insulation to be removed. As shown, the upper arms 5 with the associated heating element 11 project over the top of block 19. The gauging hole 15 is located close enough to the top surface of block 19 so that the heating element 11 can overlap the mouth of the hole 15 by an amount equal to the thickness of the cable's outer insulation, when the upper arms are pressed against the top surface of block 19.

The cable to be stripped is inserted into the blind gauging hole as far as it will go and the upper arms are then pressed against the top of block 19. This will clamp the cable between the two heating elements, which will melt through the outer insulation to the underlying braided outer conductor. The cable is then slowly rotated to complete the accurate circumferential cut. If the two heting elements are arranged flush with the front surface 20 of the block, the resulting circumferential cut will be slightly farther from the cable end than the depth of the gauging hole, by the thickness of the heating elements. Thus in this case the hole depth would be made less than the length of insulation to be stripped by the heating element thickness. It may be desirable to locate both heating elements slightly forward of the front surface of the block 19, to insure free movement of the upper heating element as it is pressed down against the top of block 19. This can be achieved by placing a shim or washer around arms 7 between the front face 20 of the block 19 and the lower heating element 9. In this event the hole depth would be further reduced to compensate for the thickness of the shim.

After the circumferential cut is made by the tool of FIG. 2, the apparatus of FIG. 3 is used to make a pair of diametrically opposed longitudinal cuts in the outer insulation, these cuts extending parallel to the axis of the cable from the circumferenial cut to the end of the cable. The tool of FIG. 3 comprises the same basic prior art thermal stripper as in FIG. 2, but with a different jig attached thereto. The jig comprises a block 21 with a V-shaped groove 23 in the upper surface thereof. The lower heating element 9 is located at one end of the bottom of groove 23, so that the top of element 9 projects up into the groove slightly, as best seen in FIG. 4. The two lower arms 7 of the thermal stripper pass through a pair of holes 39 in block 21 and are attached to heating element 9. The screws 13 which attach heating element 9 to arms 7 are countersunk so that the screw heads are flush with the surface of the element 9. The block 21 is made of electrically and thermally insulating material to prevent the shortcircuiting of the arms 7 and to prevent the excessive cooling of the heating element by the block material in contact therewith. The block 21 may conveniently be formed from separate pieces 29 and 31, as shown in FIG. 4, and held together by means of a pair of bolts 33 and 33'. The bolt 33 is screwed into a threaded hole 38 in piece 31 and its smooth shank passes through hole 35 in piece 29. The bolt 33 passes through spacer or washer 37 which has the same thickness as heating element 9 which also serves as a spacer. The other bolt 33' shown in FIG. 5 includes a similar spacer or washer. The cable to be stripped, 25, is inserted in the V-shaped groove so that the circumferential cut, 27, therein is lined up with the left edge of heating element 9, as seen in the side view of FIG. 5. The position of the heating element 9 in the groove is chosen in relation to the angle of the groove and the cable diameter, so that this heating element can penetrate to the outer braided conductor of the cable just as the outer insulated layer of Teflon comes in contact with the sloping sidewalls of the groove. Thus, before the thermal cut is made, the outer insulation rests on the heating element 9, with two small clearances approximately equal to the thickness of the outer insulation, between the cable and the sloping sidewalls of the groove 23. These clearances are indicated at 26 in FIG. 4. The upper heating element 11 is then pressed down on the top of the cable and the heat applied. After the heating elements have penetrated to the metallic outer conductor, the cable can be pulled to the left, as viewed in FIG. 5, to complete the longitudinal cuts to the end 28 of the cable 25. FIG. 6 shows how the two hemicylinderical sections of the outer insulation, 25a and 25b, can be easily removed after these cutting operations performed with the apparatus of this invention. In FIG. 6 the co-axial cable 25 comprises outer braided conductor 22, inner conductor 28', and dielectric or insulating material 30.

The two jigs for performing the two different cutting operations may be sequentially used with the same basic thermal stripper. Thus the jig of FIG. 2 may be first attached to the basic stripper and a batch of cables given circumferential cuts, after which the jig of FIGS. 4 and 5 is attached to the stripper and the longitudinal cuts made. For higher volume production each of the jigs may be permanently attached to its own thermal stripper. In this case the jig of FIGS. 4 and 5 need not be split into two pieces. The heating element 9 may be permanently built into the groove 23 as shown in FIG. 3.

While the invention has been described in connection with illustrative embodiments, obvious variations therein will occur to those skilled in this art, accordingly the invention should be limited only by the scope of the appended claims.

What is claimed is:

1. A tool for facilitating the removal of accurate lengths of plastic outer insulation from the ends of electrical cables, comprising: a first jig comprising a block made from electrically and thermally insulating material, said first jig comprising a gauging hole, a thermal stripper having upper and lower heating elements located at the ends of upper and lower arms, said lower arms projecting through holes in said block with said lower heating element located adjacent to and overlapping the mouth of said gauging hole by the approximate thickness of said plastic insulation to be removed, said upper arms extending over the top of said block and said upper heating element being capable of overlapping the mouth of said gauging hole on the opposite side thereof from said first heating element, whereby a length of said cable to be stripped may be inserted into said hole and rotated to produce an accurate circumferential cut therein, said tool further comprising a second jig which may be sequentially attached to said thermal stripper to provide a pair of diametrically opposed longitudinal cuts in said outer insulation between said circumferential cut and the adjacent end of said cable, said second jig comprising a block of electrically and thermally insulating material with a V-shaped groove therein, said lower heating element located along the bottom of said groove and projecting upward into said groove sufficiently so that said lower heating element can make a first longitudinal cut in said outer insulation when said cable is inserted into said groove, and said upper heating element is arranged above said groove and said cable to simultaneously provide a second longitudinal cut diametrically opposite to said first cut when said upper arms and heating element are pressed down on said cable.

2. The tool of claim 1 wherein said upper and lower heating elements are mounted flush with the face of said first jig which includes said gauging hole and the depth of said gauging hole is made less than the length of said insulation to be removed by the thickness of said heating elements.

3. A tool for facilitating the removal of accurate lengths of the plastic outer insulation from co-axial cables, comprising; a thermal stripper comprising a pair of blade-shaped electrical heating elements, each mounted on the ends of a pair of arms of equal length, said arms being flexible enough to permit said heating elements to be moved toward and away from each other, one pair of said arms projecting through two holes in a jig, said jig comprising a block of thermally and electrically insulating material with a blind gauging hole therein, the heating element associated with said one pair of arms being mounted adjacent and overlapping the mouth of said gauging hole on one side thereof, and said other pair of arms and its heating element being arranged to overlap the opposite side of said mouth of said gauging hole, whereby a cable to be stripped may be inserted in said gauging hole and said heating elements clamped on opposite said of said cable to cut a circumferential hole in said outer insulation as said cable is rotated in said hole.

4. A tool for making a pair of longitudinal thermal cuts in the plastic outer insulation of an electrical cable, comprising; a thermal stripper comprising a pair of blade-shaped heating element each mounted on the ends of a pair of arms of equal length, said arms being flexible enough to permit said heating elements to be moved toward or away from each other, said tool further comprising a block of insulating material with a V-shaped groove therein, one of said heating elements being located at the bottom of said V-shaped groove and projecting up into said groove a sufficient distance so that said one of said heating elements can cut completely through the said outer insulation of a cable which is inserted in said groove to produce a first longitudinal cut therein, the other of said heating elements being arranged above said groove and said cable in said groove, whereby said other of said heating elements may be pushed down on said cable to cut a second longitudinal groove therein.

5. The tool of claim 4 wherein said jig comprises two pieces which are attached to each other with said one one of said heating elements sandwiched between said pieces.

6. A tool for facilitating the removal of accurate lengths of the outer insulation of electrical cables, comprising; a first jig with a blind gauging hole therein and electrical heating elements located on opposite sides and overlapping the mouth of said gauging hole, whereby a length of cable to be stripped may be inserted in said gauging hole, clamped between said heating elements and rotated to produce a circumferential cut in the outer insulation thereof; and a second jig comprising a V-shaped groove, an electrical heating element located at the bottom of said groove and another heating element moveably mounted on arms above said groove, whereby the end of said length of cable may be inserted in said groove and clamped between said two last-named heating elements to provide two diametrically opposed longitudinal cuts in said outer insulation.

* * * * *